(12) United States Patent
Paul et al.

(10) Patent No.: US 9,023,983 B2
(45) Date of Patent: May 5, 2015

(54) EXTRUDER WITH INTEGRATED DIE PLATE AND METHOD FOR DEGASING POLYMER MIXTURES

(75) Inventors: Hanns-Ingolf Paul, Leverkusen (DE); Udo Wiesner, Bornheim (DE); Jörg Kirchhoff, Köln (DE); Thomas König, Leverkusen (DE); Klemens Kohlgrüber, Kürten (DE)

(73) Assignee: LANXESS Deutschland GmbH, Cologne, DE (US)

( * ) Notice: Subject to any disclaimer, the term of this patent is extended or adjusted under 35 U.S.C. 154(b) by 0 days.

(21) Appl. No.: 13/811,330

(22) PCT Filed: Jul. 22, 2011

(86) PCT No.: PCT/EP2011/062636
§ 371 (c)(1),
(2), (4) Date: Aug. 22, 2013

(87) PCT Pub. No.: WO2012/010693
PCT Pub. Date: Jan. 26, 2012

(65) Prior Publication Data
US 2014/0039142 A1    Feb. 6, 2014

(30) Foreign Application Priority Data

Jul. 23, 2010 (EP) .................................. 10007660

(51) Int. Cl.
| | | |
|---|---|---|
| C08F 6/00 | (2006.01) | |
| B29B 7/84 | (2006.01) | |
| B29C 47/08 | (2006.01) | |
| B29C 47/40 | (2006.01) | |
| B29C 47/60 | (2006.01) | |
| B29C 47/76 | (2006.01) | |
| B29C 47/62 | (2006.01) | |
| C08J 3/00 | (2006.01) | |
| B29C 47/00 | (2006.01) | |
| B29C 47/10 | (2006.01) | |
| B29K 23/00 | (2006.01) | |
| B29K 105/00 | (2006.01) | |

(52) U.S. Cl.
CPC ............. B29B 7/845 (2013.01); B29C 47/0009 (2013.01); B29C 47/0871 (2013.01); B29C 47/1063 (2013.01); B29C 47/404 (2013.01); B29C 47/6031 (2013.01); B29C 47/6056 (2013.01); B29C 47/762 (2013.01); B29C 47/763 (2013.01); B29C 47/767 (2013.01); B29K 2023/083 (2013.01); B29K 2023/22 (2013.01); B29K 2105/0005 (2013.01); B29C 47/40 (2013.01); B29C 47/62 (2013.01); B29C 47/6062 (2013.01)

(58) Field of Classification Search
CPC .................................... C08F 6/02; C08C 1/14
USPC .......................................................... 528/501
See application file for complete search history.

(56) References Cited

U.S. PATENT DOCUMENTS

| | | | | |
|---|---|---|---|---|
| 3,501,807 | A | * | 3/1970 | Selbach .................... 425/192 R |
| 3,963,558 | A | | 6/1976 | Skidmore |
| 5,738,884 | A | | 4/1998 | Sato |
| 8,388,216 | B2 | | 3/2013 | Lechner et al. |
| 2012/0043687 | A1 | | 2/2012 | Kirchhoff et al. |

FOREIGN PATENT DOCUMENTS

| | | | |
|---|---|---|---|
| DE | 623903 | A | 1/1936 |
| DE | 3431063 | * | 3/1985 |
| EP | 0551816 | A1 | 7/1993 |
| JP | 59048136 | * | 3/1984 |

OTHER PUBLICATIONS

European Search Report from co-pending Application EP10007660 dated Oct. 13, 2010, 3 pages.

* cited by examiner

*Primary Examiner* — Terressa Boykin

(57) ABSTRACT

The invention is directed to an extruder (10), particularly for extruding a synthetic rubber product, which comprises a barrel (24), one or several extruder elements (12, 14), particularly one or several extruder screws and/or a kneader elements (14), arranged inside the barrel (24) for conveying the product, optionally an inlet port for feeding a stripping agent into the barrel (24) and an outlet port for removing volatile compounds from the product and, where applicable, the stripping agent. According to the invention a perforated die plate (26) is fixed to the barrel (24) in flow direction before the outlet port. Since the die plate (26) is not fixed to the extruder elements (12, 14) but to the barrel (24) a circumferential clearance between the die plate (26) and the barrel (24) is prevented so that no extruded material is passing the die plate (26) radially outside. Parts of the extruded material comprising a low surface area to volume ratio are prevented so that the evaporation of volatile compounds is facilitated.

20 Claims, 8 Drawing Sheets

Figure 1:
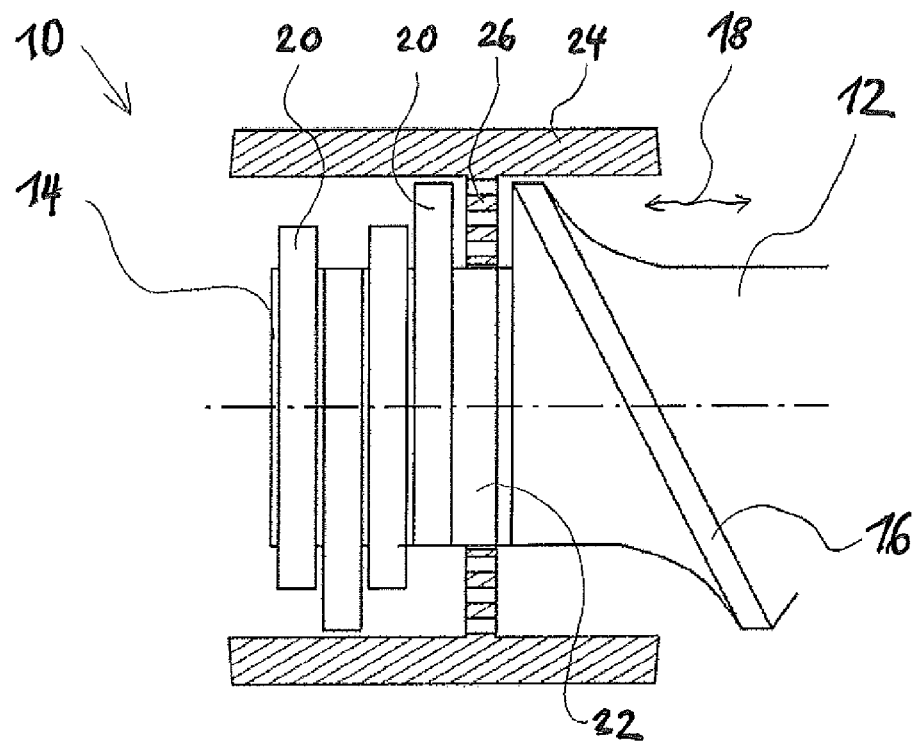

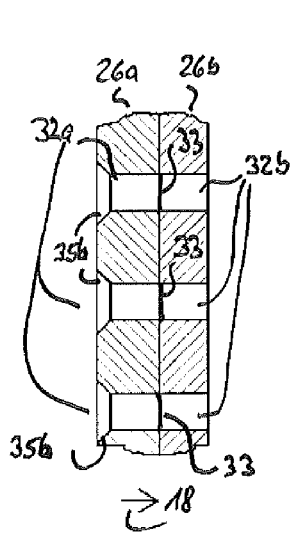 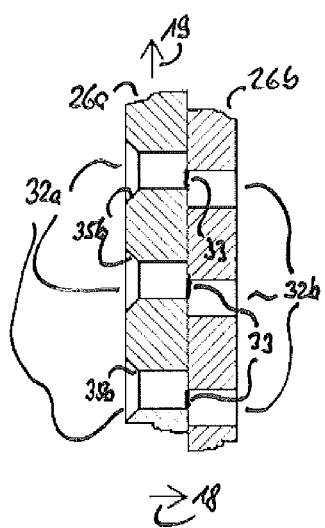 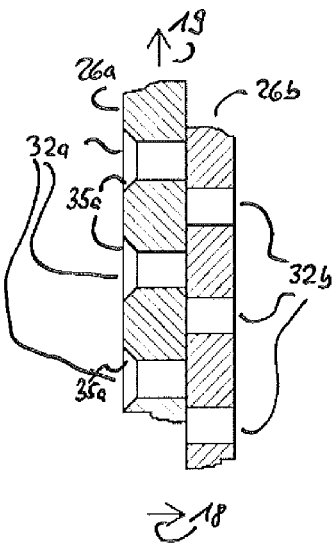
Fig. 9         Fig. 10        Fig. 11
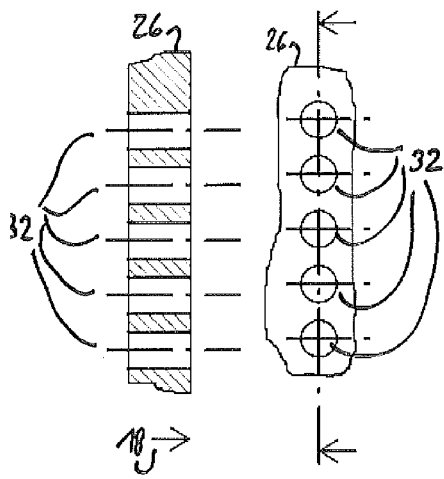 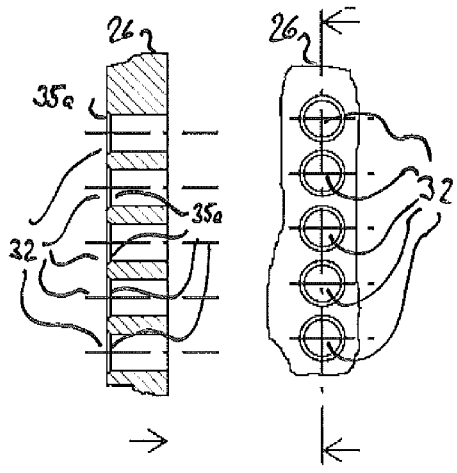
Fig. 12        Fig. 13

EXTRUDER WITH INTEGRATED DIE PLATE AND METHOD FOR DEGASING POLYMER MIXTURES

The present invention relates to a process for removing of volatile compounds from viscuous or viscoelastic masses, in particular from polymers such as synthetic rubbers.

Synthetic rubbers have important industrial uses and are typically produced by the (co)polymerization of monomers, which is typically carried out via slurry, emulsion or solution processes. Examples of synthetic rubbers include butyl rubbers and halogenated butyl rubbers (IIR, BIIR, CIIR), polyisobutylene (PIB), ethylene propylene diene M-class rubbers (EPDM), ethylene propylene rubbers (EPM), ethylene-vinyl acetate rubbers (EVM and EVA), nitrile butadiene rubbers (NBR), hydrogenated nitrile butadiene rubbers (HNBR), polyisoprene rubbers (IR), fluorinated rubbers (FR), polychloroprenes (CR) butadiene rubbers (BR), and styrene-butadiene rubbers (SBR).

After the (co)polymerization, the reactor discharge mixture contains at least the polymer, solvents, residual monomers and the catalyst. To recover the polymer, the discharge stream is typically treated with steam and hot water. Most of the solvent and the unreacted monomers are thereby flashed off. One disadvantage of the contact with steam and water is, that synthetic rubbers are coagulated. The rubber polymers are then present in the form of wet crumbs in water. Most of the water is then be separated by draining, followed e.g. by the application of drying extruders and a final drying step.

Copolymerization of isobutene and isoprene, which leads to butyl rubber, for example is carried out industrially at low temperatures of approximately −60° C. to −100° C. to obtain high molar masses. The slurry process uses chloromethane as a diluent while the solution process uses an inert hydrocarbon as a solvent. After the polymerization, the butyl rubber polymer is present either as a slurry in chloromethane or as a homogeneous solution in a hydrocarbon. Unreacted monomers are also present in the reactor discharge mixture. The butyl rubber polymer needs to be recovered and isolated from the diluent or solvent.

In the slurry process, the polymerization reactor discharge stream is treated with steam and hot water in a flash drum. Most of the chloromethane and the unreacted monomers are thereby flashed off and the water is separated from the vapors by condensation. When the polymer from the reactor is to be processed further, such as by halogenation, the butyl rubber product may be recovered directly as a solution by discharging the reactor content into a hot solvent such as hexane. The chloromethane is evaporated after this stage and a further stripping stage is applied to remove remaining monomer residues.

In the solution process, an inert hydrocarbon solvent and an aluminium alkyl halide catalyst are applied during the polymerization step. The remaining monomers are then removed from the reactor solution in a distillation stripping process. After this distillation step, the butyl rubber polymer is present as a homogeneous solution in a hydrocarbon. This solution can either be processed further, such as being subjected to a halogenation step, or the butyl rubber polymer can be isolated directly from the solution. The isolation of the butyl rubber from solution is similar to that of the slurry process and also involves contact with steam and hot water, whereby the polymer coagulated. The butyl rubber polymer is then present in the form of wet crumbs in water (6 to 10 wt % polymer in water). To counteract the coagulation, salts of fatty acids are added in the flash drum containing the butyl rubber crumbs in water following the coagulation/steam stripping process.

After the addition of additives, butyl rubber is then converted into the final commercial bale form through further drying. The drying is typically effected by draining, followed by the application of drying extruders and a final drying step in a fluidized bed.

A butyl rubber thus obtained, without chemical modification, is called a 'regular' rubber.

A commercially important chemical modification of butyl rubber is halogenation which leads to chlorinated and brominated butyl rubber, hereinafter also also denoted as halobutyl rubbers or individually as bromobutyl rubber or chlorobutyl rubber.

Halobutyl rubber is technically produced by contacting a solution of regular butyl rubber in an alkane with chlorine or bromine in an agitated vessel. Said solution is generally denoted as cement. Unreacted halogen and hydrogen halide formed as byproduct are neutralized by the addition of a caustic solution. Additives can also be incorporated at that stage. The resulting solution is then steam-stripped to remove the solvent, thereby coagulating the rubber into a solid product. The solid product is generally recovered as a 5 to 12% slurry in water. Stabilizers and/or antioxidants are added to the halogenated butyl rubber immediately before recovery. The halogenated butyl rubber is then finished using mechanical drying equipment in a process analogous to that used for regular butyl rubber; however, because of the greater reactivity of the halogenated product, less severe conditions are employed.

The aforementioned mechanical dewatering can only reduce moisture content down to approximately 5 to 15%. Additional thermal drying stages are then required. The rubber is thereby heated to 150 to 200° C. under pressure in a single screw or twin screw extruder.

Die plates may be provided to maintain the pressure. When the rubber is pushed through the die plate at the outlet of the extruder, the water in the rubber evaporates and forms open porous crumbs. A cutting device then cuts the crumbs into small pieces. The crumbs are conveyed to a convective dryer where residual moisture is removed by hot air. After such drying, the (halo)butyl rubber generally has a moisture content of 0.1 to 0.7%. A cooling stage, accomplished by flowing cold air through the rubber crumbs, is then needed to cool the butyl rubber crumbs down to the maximum baling temperature of 60° C. The crumbs are then formed into bales by hydraulic presses, and the bales are packed into boxes or crates for shipment.

WO2010/031823 A discloses a process for removing volatile compounds from a fluid containing at least one non-volatile polymer and at least one volatile compound by means of an extruder comprising vent ports, through which the volatile compounds are removed in gaseous state. In one embodiment the removal is aided by the action of a stripping agent such as water, carbon dioxide or other inert gases. Adding a stripping agent typically causes reduction of the partial pressure of the volatile compound to be removed thus allowing higher total pressures. In addition to that the partial the stripping agent helps to obtain a porous structure of the polymer, which facilitates diffusion of the volatile compound from the polymer into the gaseous phase.

The basic design of a stripping agent zone is known to those skilled in the art. For co-rotating twin screw extruders, it is shown, for example, in Klemens Kohlgrüber: Co-rotating twin screw extruders. Principles, Technology and Applications. ISBN 978-3-446-41372-6 on page 188, FIG. 10.6. The stripping agent zone comprises a backward-pumping element, a stripping agent dispersion zone, and a pressure reduction zone. In that figure, the pressure reduction is accomplished by backwards-conveying elements.

The disadvantage of the use of backward-pumping elements for pressure reduction arrangement is that, for viscoelastic products with a high viscosity such as synthetic rubbers, large particles with a dimension of approximately the channel depth are formed. Stripping agent trapped more than one or two millimeters from the surface of such a large particle will not be able to "blow" an open channel to the surface, and thus removal of solvent from the product zone in the center of the particle will be effectively impossible. Also, because larger extruders necessarily have deeper channel depths, this problem becomes worse for scale-up. Alternative pressure-reduction zones for co-rotating twin screw extruders known to those skilled in the art are backwards-pumping kneading blocks.

Backwards-pumping kneading blocks are described, for example, in Klemens Kohlgrüber: Co-rotating twin screw extruders. Principles, Technology and Applications. ISBN 978-3-446-41372-6, hereinafter referred to as "[1]", p. 102 and page 225.

Backwards-pumping kneading blocks for pressure reduction, however, suffer from the same disadvantages as backwards-pumping conveying elements, i.e. the formation of large particles, from which the removal of volatile compounds is substantially prevented or even impossible, and the same problems with scale-up occur.

As an alternative, rotating blister discs may be employed. Rotating blister discs are, for example, described in [1], p. 235, FIG. 12.35.

Blister discs are an assembly of discs, one on each extruder shaft. Each disc has a small clearance to the barrel wall of the extruder. For a twin screw or multi-screw extruder, at the same axial position, corresponding shaft have the corresponding smaller diameter. These discs contain holes, which act as dies and aid the formation of thin strands. If the diameter of the strands is small enough, the stripping agent can, in theory, open channels to the surrounding gas phase, which aids the removal of volatile compounds.

A drawback of this arrangement of the pressure-reduction zone is that, for viscoelastic and shear-thinning products, a substantial amount of product passes through the gap between the two discs and through the clearance between the blister discs and the barrel. Thereby, balls of material are formed which clot the strands, making effective removal of volatile compounds more difficult. In addition to that, an even larger stream of the product can escape through the gaps into the intermeshing zone of the barrels, also leading to the formation of balls which are difficult to degas efficiently.

Another possible arrangement of a pressure-reduction zone is disclosed in EP 0 551 816 A. Therein, a fixed die plate in a multi-shaft extruder is disclosed, which can rotate freely with respect to the screw shafts. Said die plate comprises at least one product passage and has a radial clearance between the circumference of the plate and the extruder barrels.

A drawback of this arrangement is that viscoelastic, shear-thinning products can pass through the clearance between the circumference of the die plate and the extruder barrel, which leads to additional ball formation and the same disadvantage as with the rotating blister discs described above. Another drawback is that, depending on the exact nature of the clearances, product may remain in the gap between the housing and the barrel for a long time, degrade and cause quality problems.

In view of the aforementioned there was still need for an extruder, and equipment suitable therefor that allows the formation of small particles within the extruder and therefore easier removal of volatile compounds. Furthermore there was a long felt need of reducing the overall effort for drying synthetic rubber products.

This object is solved by an extruder comprising at least
one barrel,
one or several extruder elements in particular at least one extruder screw and/or at least one kneader element, arranged inside the barrel,
at least one outlet port for removing volatile compounds and optionally a stripping agent and
optionally, but preferably, at least one inlet port for feeding a stripping agent into the barrel
whereby the extruder further comprises at least
one perforated die plate fixed to the barrel in flow direction before the outlet port or, where at least one inlet port is present between the inlet port and the outlet port.

As used herein "extruder elements" denote any type of element fixed to or part of the shafts of the extruder and include but are not limited to kneading elements, backward and forward conveying elements such as screw elements and other elements of a like nature and known to one skilled in the art.

The scope of the invention further comprises the die plates as such as far as they are suitable to be fixed into the barrel of an extruder.

It is pointed out that the scope of the invention also encompasses any desired combinations of the ranges and areas of preference specified for each feature as well as any combination of constructional designs and preferred embodiments disclosed herein.

It was surprisingly found that the removal of volatile compounds can be significantly improved by the installment of fixed die plates, which are connected to the barrel and which do not have a gap to the extruder barrel. These die plates contain holes, which generate the back pressure and form strands which aid degassing. A support opening allows for the rotation of the shaft(s) or screw(s).

Since the die plate is not fixed to the conveying means but to the barrel a circumferential clearance between the die plate and the barrel is prevented so that no extruded material is passing the die plate radially outside. Formation of extruded material comprising a low surface area to volume ratio is prevented so that the evaporation of volatile compounds is facilitated or, in one embodiment, the same amount of stripping agent can come into contact with an increased surface area, increasing the overall capacity of the stripping agent to remove volatile compounds from the product. If so at all, a circumferential gap is only provided between the die plate and the shaft of the conveying means, where the shaft is led through the die plate. The average particle size can significantly be decreased, thereby increasing the surface area to volume ratio. Due to the increased surface area to volume ratio the removal of volatile compounds is enhanced. If a stripping agent is used an the die plate is fixed between the inlet port and an outlet port it is further ensured that the stripping agent must pass the die plate thereby further intensifying the contact between the stripping agent and the product.

Suitable extruder types include single-screw and multi-screw extruders comprising any number of barrels and types of screw elements and other single- or multi-shaft conveying kneaders. Possible embodiments of multi-screw extruders are twin-screw extruders, ring extruders or planetary roller extruders, whereby twin-screw extruders and ring extruders are preferred. Twin screw extruders are for example counter-rotating intermeshing, counter-rotating non-intermeshing, co-rotating intermeshing and co-rotating non-intermeshing twin screw extruders, where co-rotating intermeshing twin screw extruders are preferred.

Suitable extruder elements for the extruder are not only extruder screws but also kneading sections comprising kneader elements for energy input into and mixing of the product. Such kneading elements are described in [1], page 102 and page 205. Examples of kneading elements include kneading blocks, which may be designed as double or triple flighted forward, backward or neutral conveying kneading blocks; single or double flighted screw mixing elements with grooves, single flighted tooth mixing elements, blister plates and single, double or triple flighted eccentric discs. The kneader elements may be assembled in any combination on the shafts of the extruder, in particular the shafts of an twin screw counter rotating or co-rotating twin screw extruder.

The extruder according to the present invention preferably comprises at least one inlet port for feeding a stripping agent into the barrel. In this case the extruder preferably further comprises at least one dispersion section which is, in flow direction, arranged directly before the die plate, where the stripping agent is mixed, dispersed and possibly dissolved completely or partially.

A typical dispersion section comprises two to ten kneading blocks. For mixing in of a stripping agent, tooth type elements or screw elements with grooves may be applied. Eccentric discs are preferably applied in the last section of the extruder, where the product is typically highly viscous and substantially free of volatile compounds. For planetary roller extruders, kneading elements like tooth shaped rollers are or rollers with grooves and clearances are preferred.

Since the stripping agents and volatile compounds being removed from the product have a tendency to entrain parts of the product towards a vent of the at least one outlet port, in a preferred embodiment of the invention the outlet port and/or the inlet port are designed to prevent the product from coming out of the ports. Suitable means to accomplish that purpose are stuffer screws, that are mounted on a vent of the ports and convey any material back into the extruder, or rollers or belts, that are applied to the inside of the vent ports to push deposited material back into the extruder. Such stuffer screws are known to those skilled in the art and are described, for example, in [1], page 192. As an alternative or in addition to the aforementioned, coatings of the vent ports may be applied which reduce or prevent sticking of the material to the surface. Suitable coatings include DLC, Ethylene-Tetrafluoro ethylene (ETFE), Polytetrafluoroethylene (PTFE) and Nickel-Alloys. The pressure at the ports is for example between 1 hPa and 2,000 hPa and preferably between 5 hPa and 900 hPa.

Generally, the stripping agent is removed together with other volatile compounds. Even though the stripping agent may be added anywhere in the extruder, the addition in one or more dispersion sections is preferred. In a more preferred embodiment a stripping agent is added in one or more dispersion sections. Suitable stripping agents are substances that are inert to the product and are either gases (having a critical temperature below the process temperature) or preferably have a vapor pressure greater than 100 hPa at 100° C. In the context of the invention, the term "inert" means that the stripping agent does not or virtually not react with the polymers contained in the product. Suitable stripping agents are for example nitrogen, carbon dioxide, noble gases, methane, propane, butane, water or a mixture of the aforementioned substances. If stripping agents and in particular water are employed, preferably in liquid form, the stripping agents may further contain additives such as antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. Examples of such additives include epoxidized soy bean oil (ESBO) and calcium-stearate.

The amount of stripping agent may be 0.0001 to 10 weight-%, preferably 0.001 to 5 weight-% and more preferably 0.1 to 2 weight-% based on the amount of the product obtained at the outlet section of the extruder.

The die plates are typically fixed to the barrel substantially orthogonally to the axis of the shafts. Essentially orthogonal means an angle to the axis of the shaft of 70 to 90°, preferably 80 to 90° more preferably 90°.

The perforated die plate comprises at least one support opening for receiving one or more shafts of the corresponding conveying means. The shafts of the conveying means can be led through the die plate, particularly for operating a further conveying means on the other side of the die plate. Particularly the shaft can be supported and/or guided by the die plate by means of the support opening designed correspondingly to the shaft(s) of the conveying means. Preferably, the gap between the conveying elements and the die plate is reduced to a minimum.

In one embodiment of the invention, the support opening provides a slide bearing for the shaft of the conveying means. Due to the sliding contact of the shaft to the die plate inside the support opening a clearance gap. Then, the only way through the die plate for the product and the stripping agent is through the perforation openings of the die plate.

In a further embodiment a clearance s is provided between an inner rim of the support opening and the shaft of the conveying means, wherein the clearance s is in relation to an inner diameter D of the barrel particularly $0.001 \leq s/D \leq 0.02$, preferably $0.002 \leq s/D \leq 0.01$ and more preferred $0.003 \leq s/D \leq 0.006$.

At the same time the clearance is small enough that product pressed through the clearance gap still comprises a comparably high surface area.

The typical thickness of the die plates are in the range of from 3 mm to 80 mm, preferably 3 mm to 50 mm, more preferably of from 3 mm to 30 mm and in a further embodiment of from 5 mm to 20 mm.

As used herein the term "thickness" denotes the average channel length of the perforations. It is apparent for those skilled in the art, that the thickness may vary over the die plates. In particular, the die discs may be reinforced by elements increasing the stiffness of the die plate such as rods or embossments which may be arranged radially, crisscross or in any other geometrical form and which may not have any influence on the average channel length of the perforations. Suitable materials for the die plates include those which are also typically used for the barrel and the conveying elements and include wear resistant materials such as nitrided steel, duplex steel, stainless steel, nickel-based alloys, cobalt-based alloys, composite materials like sintered metals, hot isostatic pressed materials, hard wear resistant materials like Stellite, coated metals with coatings for example made from ceramics, titanium nitride, chromium nitride and diamond like carbon (DLC).

In one embodiment the die plates are at least in flow direction are additionally coated by titanium carbide or nitride, chromium nitride, tungsten carbide and diamond like carbon (DLC).

The die plate comprises at least one, preferably a plurality of perforation openings, which may have any form. For example the perforation openings may have funnel or conical shape, a convergent or divergent nozzle shape, hour-glass shape, channel shape, circular or non-circular. The number and the design of the perforation openings are for example chosen such that the sum of the effective cross sectional areas of all perforation openings is from 2 to 40% of the whole cross sectional area of the die plate within the barrel excluding the support opening(s), preferably from 4 to 20%.

The effective cross sectional area of a perforation opening is understood as the smallest cross sectional area of each perforation opening through which product can pass the die plate.

The perforation openings for example on the downstream side for example have an average diameter d of 1 mm≤d≤6 mm, particularly 1.5 mm≤d≤5 mm and preferably 2 mm≤d≤4 mm. The average diameter is understood as the diameter of a circular perforation opening with the same cross sectional area. This diameter of the perforation opening on the downstream side of the die plate leads to a suitable high surface area to volume ratio.

In one embodiment the die plate comprises at least one perforation opening, wherein the perforation opening comprises in axial direction of the barrel a main opening extending only over a part of the axial thickness of the die plate, wherein the main opening is followed in axial direction by at least one orifice, wherein the orifice comprises a smaller cross section than the main opening. The perforation opening may comprise different cross sectional areas in flow direction over the thickness of the die plate. This leads to a high mechanical stability without significantly increasing the overall pressure drop over the die plate.

For example the main opening may designed funnel-shaped for leading a high mass of product to the orifice without an unnecessary high counter pressure. At the same time the cross section area of the orifice may be such small that a kind of spray effect may be provided leading to a plurality of small particles of the product leading to a very high surface area to volume ratio. The die plates are preferably designed to cause a pressure drop of for example from 0.3 MPa to 6.0 MPa, preferably 0.5 MPa to 5.0 MPa and further preferred from 1.0 MPa to 4.0 MPa over the die plate at a typical effective shear rate $$\dot{\gamma} = \frac{\dot{V}}{r^3}$$

of 10 to 10000 reciprocal seconds, preferably from 30 to 5000 reciprocal seconds and more preferably from 100 to 3000 reciprocal seconds. In the formula $\dot{V}$ denotes the volume flow of the product in cubic meters per second and r denotes the effective radius of the die opening in meters.

Preferably a further extruder element, particularly an extruder screw and/or a kneader is provided downstream to the die plate and particularly upstream to the outlet port. Particularly a plurality of conveying and/or degassing stages are provided, wherein preferably each stage is optimized to the expected parameters particularly to the expected amount of volatile compounds to be removed from the product. Particularly from 1 to 6, preferably from 1 to 4 die plates are provided in the flow path of the product within the extruder, wherein the cross section area of the perforation openings can be adapted to the expected parameters particularly the expected amount of volatile compounds of the product.

Particularly the further extruder element comprises a conveying element, wherein the maximum axial distance S between the conveying element and the die plate is 0.5 mm≤S≤10 mm, particularly 1 mm≤S≤7 mm and preferably 1.5 mm≤S≤5 mm.

In another embodiment the further extruder element comprises a conveying element, wherein the maximum axial distance S between the conveying element and the die plate is 0.01 xD≤S≤0.25 xD, whereby D is the inner diameter of the barrel.

The axial distance S is measured parallel to the rotation axis of the further conveying means. In addition or in alternate the same situation may apply to the conveying means on the upstream side of the die plate. An unnecessary large gap between the conveying means and the die plate is prevented. The extruding effect is not significantly hampered by the provision of the die plate. Particularly the conveying elements apply at least partially an axial force to the product for building up a pressure to move the product in flow direction.

Preferably the further extruder element comprises a larger free volume than the extruder element. In a preferred embodiment the further extruder element comprises conveying elements of the shear edge profile or the box profile. Such profiles are known to those skilled in the art of twin- and multi-screw extruders an are described, for example, in [1] on page 222 in FIG. 12.12. Due to this profile of the conveying elements and the increased free volume a higher volume flow rate can be provided.

In one embodiment a further barrel is provided, wherein the die plate is fixed between the barrel and the further barrel, particularly by means of a flange joint. This leads to a facilitated and fast fixation of the die plate within the extruder. The die plate may comprise openings for the fastening means of the flange joint. In addition or in alternate the barrel can be connected to the further barrel by means of at least one tension rod.

Preferably the barrel and/or a further barrel connected to the barrel comprises a recess for receiving at least partially the die plate. The barrel and the further barrel may be connected together by means of a flange joint. The die plate may be clamped between the barrel and the further barrel without the need for openings in the die plate for the fastening means for connecting the barrel to the further barrel. If so, the die plate may be centered in the recess via its radial outer surface. Particularly the die plate is press fitted in the recess. The die plate may be inserted into the recess before the barrel is connected to the further barrel without the need of further adjusting the die plate during the connection of the barrel to the further barrel.

Particularly preferred the die plate is split in radial direction, wherein the split is arranged particularly radial to an at least one support opening each for receiving a shaft of the corresponding conveying means. Particularly the die plate is split into a lower body and an upper body, wherein both bodies are preferably substantially of identical shape or mirror shape. Particularly at extruder types comprising more than one conveying means in parallel, particularly meshing with each other, the assembling of the die plate is facilitated.

In one embodiment two or more, preferably two die plates are arranged in axial direction in very close proximity or even with contact to each other so that the apparent effective cross sectional areas of the perforation openings leading through the two or more, preferably two die discs can be varied when the die plates are fixed to the barrel in different radial positions relative to each other.

In a preferred embodiment thereof the axial distance of the two or more die plates is 5 mm or below, preferably 2 mm or below and even more preferably 1 mm or below.

A major advantage of this is that the extruder can be easily adjusted to different product requirements and degassing problems In a further embodiment the die plate is bordered by inserts, wherein the inserts are fixed to the barrel. The die plate can be inserted into the extruder by sliding at the edges of the inserts. The insert direction of the die plate is defined by the inserts. Particularly when the die plate is split, the parts of the die plate can be easily positioned by means of the inserts, wherein preferably only the inserts are fixed to the barrel be means of fastening means. The die plate can be positioned, particularly clamped, by means of the inserts.

In one embodiment of the invention the extruders can either be heated via the barrels to temperatures up to 300° C. or cooled. In a preferred embodiment, the extruder comprises means to operate separate zones independently of each other at different temperatures so that the zones can either be heated, unheated or cooled. In another preferred embodiment the extruder comprises for each conveying section at least one separate zone, which can be operated independently at different temperatures.

In one embodiment of the invention the extruder is operated at a feed rate of 5 to 25,000, preferably of 5 to 6,000 kilograms per hour.

Generally, the extruder unit may comprise one or more side feeders, which may positioned anywhere in the extruder, preferably in close proximity to the feeding section of the product or the outlet section. Side feeders are suitable for the addition of additives to the product.

The invention further comprises the use of the extruder and the die plate according to the invention for the manufacture or processing of non-volatile polymers as defined hereinabove.

The invention further relates to a process of removing volatile compounds from a mixture (M) containing at least one non-volatile polymer and at least one volatile compound to obtain a product (P) which is substantially free of volatile compounds, the process comprising at least the steps of:
  feeding the mixture (M) into at least one extruder comprising at least one barrel, one or several extruder elements in particular at least one extruder screw and/or at least one kneader shaft, arranged inside the barrel, at least one outlet port for removing volatile compounds and optionally a stripping agent and optionally, but preferably, at least one inlet port for feeding a stripping agent into the barrel at least one perforated die plate fixed to the barrel in flow direction before the outlet port or, where at least one inlet port is present between the inlet port and the outlet port
  pressing the mixture (M) through the at least one die plate of the extruder and
  removing the volatile compounds through the at least one outlet port.

Preferably, the mixture (M) is free-flowing upon entering the extruder. In the context of this invention, the term "free-flowing" means a viscosity in the range of 500 to 50.000.000 mPa*s, preferably 5.000 to 30.000.000 mPa*s and most preferably 10.000 mPa*s to 300.000 mPa*s.

As far as not mentioned otherwise the viscosity values of fluids refer to the zero shear viscosity extrapolated from measurements at given temperature using a Haake Rheostress RS 150 viscosimeter or a rotational rheometer of cone-plate type for very viscous samples. The extrapolation is performed by taking a $2^{nd}$ order polynomial to reflect the shear stress vs shear rate graph obtained from the measurements. The linear portion of the polynomial reflects the slope at a shear rate of zero and thus represents the zero shear viscosity. In the context of this invention, the term "substantially free of volatile compounds" means a total concentration of volatile compounds of less than 1 wt %, preferably less than 0.5 wt % based on the mass of the non-volatile polymer.

In particular, the term "substantially free of volatile compounds" means substantially free of water and substantially free of volatile organic compounds.

Non-volatile polymers are considered to be substantially free of water, if the residual water concentration is less than 0.5 wt % preferably less than 0.25 wt %, more preferably less than 0.1 wt % and most preferably less than 0.075 wt % based on the mass of the polymer.

In the context of this invention, the term "volatile organic compounds" means organic compounds having a boiling point of below 250° C. at standard pressure.

Non-volatile polymers are considered substantially free of volatile organic compound, if the residual concentration of said volatile organic compounds is less than 0.75 wt % preferably less than 0.25 wt % and most preferably less than 0.1 wt % based on the mass of the polymer. Said volatile organic compounds are typically the solvents employed in the polymerization or subsequent processing steps such as, for example, a halogenation step.

Preferred non-volatile polymers are synthetic rubber products.

In the context of this invention, synthetic rubber products include butyl rubbers and halogenated butyl rubbers (IIR, BIIR, CIIR), polyisobutylene (PIB), ethylene propylene diene M-class rubbers (EPDM), ethylene propylene rubbers (EPM), ethylene-vinyl acetate rubbers (EVM and EVA), nitrile butadiene rubbers (NBR), hydrogenated nitrile butadiene rubbers (HNBR), polyisoprene rubbers (IR), fluorinated rubbers (FR), polychloroprenes (CR) butadiene rubbers (BR), and styrene-butadiene rubbers (SBR).

Preferred synthetic rubber products are butyl rubbers and halobutyl rubbers like bromobutyl and chlorobutyl rubber, whereby bromobutyl rubber is even more preferred.

In the context of this invention butyl rubber denotes a (co)-polymer of isobutene(2-methylpropene) and isoprene (2-methylbuta-1,3-diene). On a molar basis, the isoprene content in the polymer is between 0.001% and 5, preferably between 1.8 and 2.3 mol %. Butyl rubber is composed of linear polyisobutene chains with randomly distributed isoprene units. The isoprene units introduce unsaturated sites into the polymer chain to enable vulcanization. The mass average molecular weight of butyl rubber molecules $M_w$ is typically between 50,000 and 1,000,000 g/mol, preferably between 300.000 and 1,000,000 g/mol.

The halogenated butyl rubbers also contain a certain amount of halogen chemically bound to the rubber molecules. The amount of chemically bound halogen is typically in the range of more than 0 to 3 wt % with respect to total mass of the polymer. The (halo)butyl rubbers may also contain additives, e.g. 0.0001 to 4 phr (phr=parts per hundred rubber with respect to rubber weight), epoxidized soy bean oil (ESBO), 0.0001 to 5 phr calcium stearate and 0.0001 to 0.5 phr antioxidants. Other additives are also applicable, dependent on the application of the butyl rubber product, i.e. fillers or colorants.

In case of bromobutyl rubber, the typical bromine content in the final product is 1.5 to 2.5 wt %, preferably 1.6 to 2.0 wt %.

In case of chlorobutyl rubber, the typical chlorine content in the finished product is 1.0 to 1.5 wt %, preferably 1.15 to 1.35 wt %.

Mixture (M) contains for example
i) from 20 to 99.9 wt %, preferably 30 to 95 wt-% and more preferably from 40 to 75 wt.-% of a non-volatile polymer, preferably a synthetic rubber and more preferably a (halo)butyl rubber and
ii) volatile compounds, in particular volatile organic compounds or volatile organic compounds and water, whereby the aforementioned components i) and ii) add up to 90 to 100, preferably 95 to 100 wt % and more preferably to 100 wt-% of the total mass of mixture (M).

The remainder to 100%, where existent, may comprise or consist of for example additives and auxiliary products typically added to synthetic rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry.

The volatile organic compounds are preferably those having a boiling point of 200° C. or less at 1013 hPa and are preferably selected from the group consisting of aliphatic alcohols such as methanol, ethanol, n-propanol, isobutanol, n-pentanol, neopentanol, cyclohexanol, n-hexanol, aromatic alcohols such as benzylic alkohol, phenylethanol and phenoxyethanol, esters such as ethylacetate, butylacetate, ethers such as methyl-tertiary butyl ether, tetrahydrofurane and 1,4-dioxane, ketones such as acetone and methylethylketone, unhalogenated, partially halogenated or fully halogenated aromatic or aliphatic hydrocarbons such toluene, xylenes, chlorobenzene, dichlorobenzene, dichloromethane, trichloromethane, n-pentane, iso-pentane, n-hexane, cyclo-hexane, iso-hexane, methyl-cyclopentane, methyl-cyclohexane and n-heptane, nitrites such acetonitrile and benzonitrile and amides such N,N-dimethylformamide, N,N-dimethylacetamide, N-methylformanilide and N-methylpyrrolidone and any mixtures comprising or consisting the aforementioned compounds.

More preferred volatile organic compounds are n-pentane, iso-pentane, n-hexane, cyclo-hexane, iso-hexane, methyl-cyclopentane, methyl-cyclohexane and n-heptane as well as mixtures comprising or consisting of those alkanes.

Figure 2:
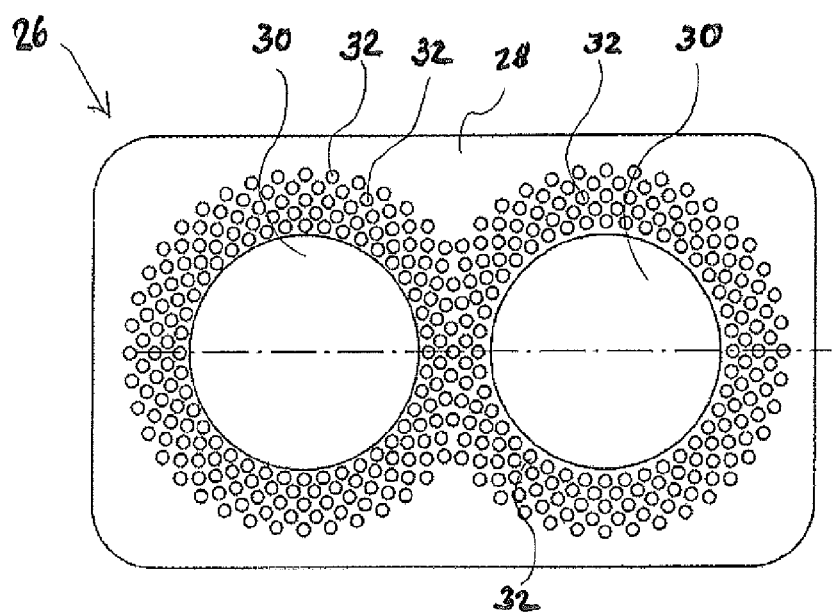
Figure 3:
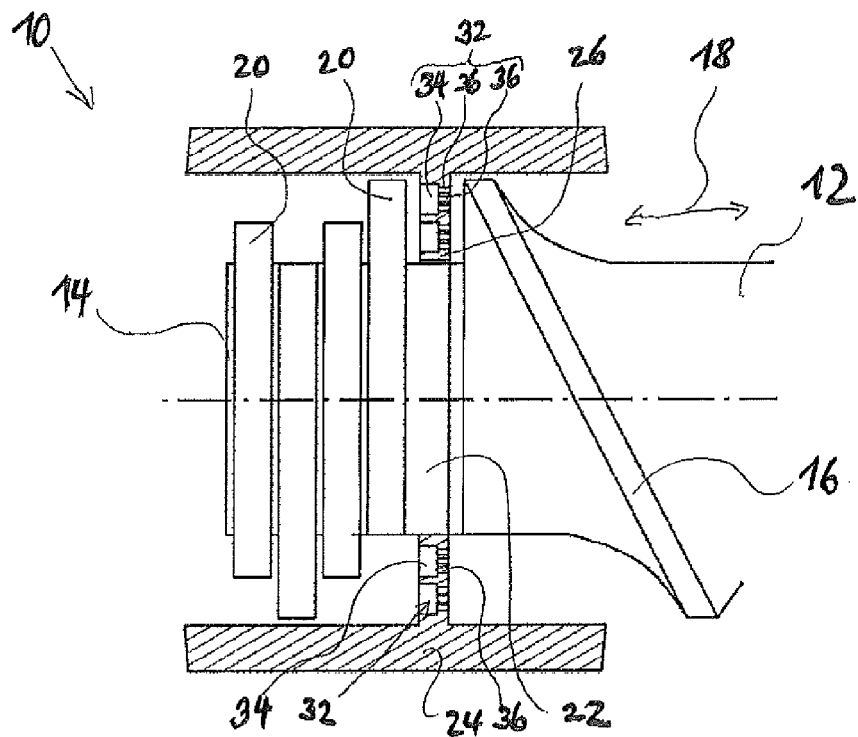
Figure 4:
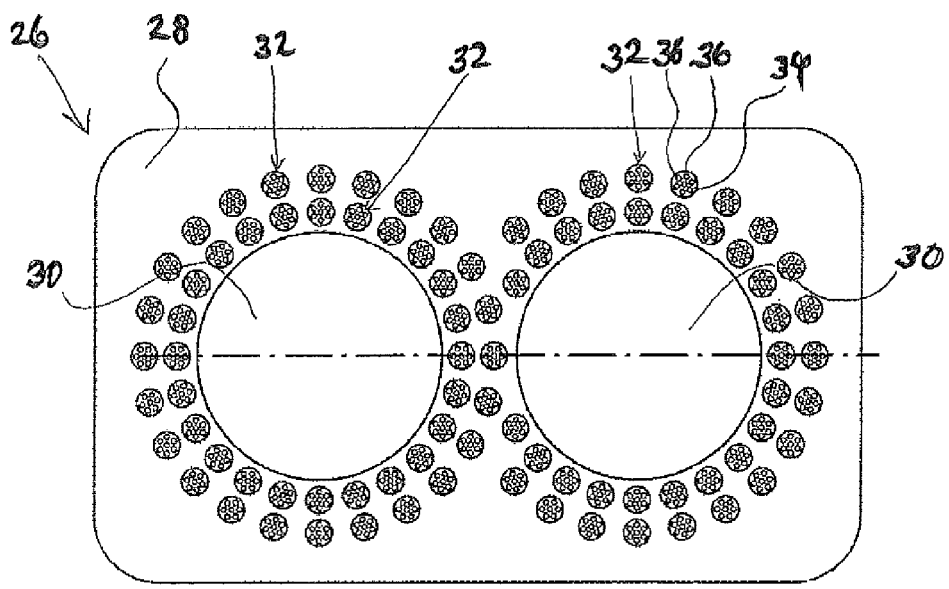
Figure 5:
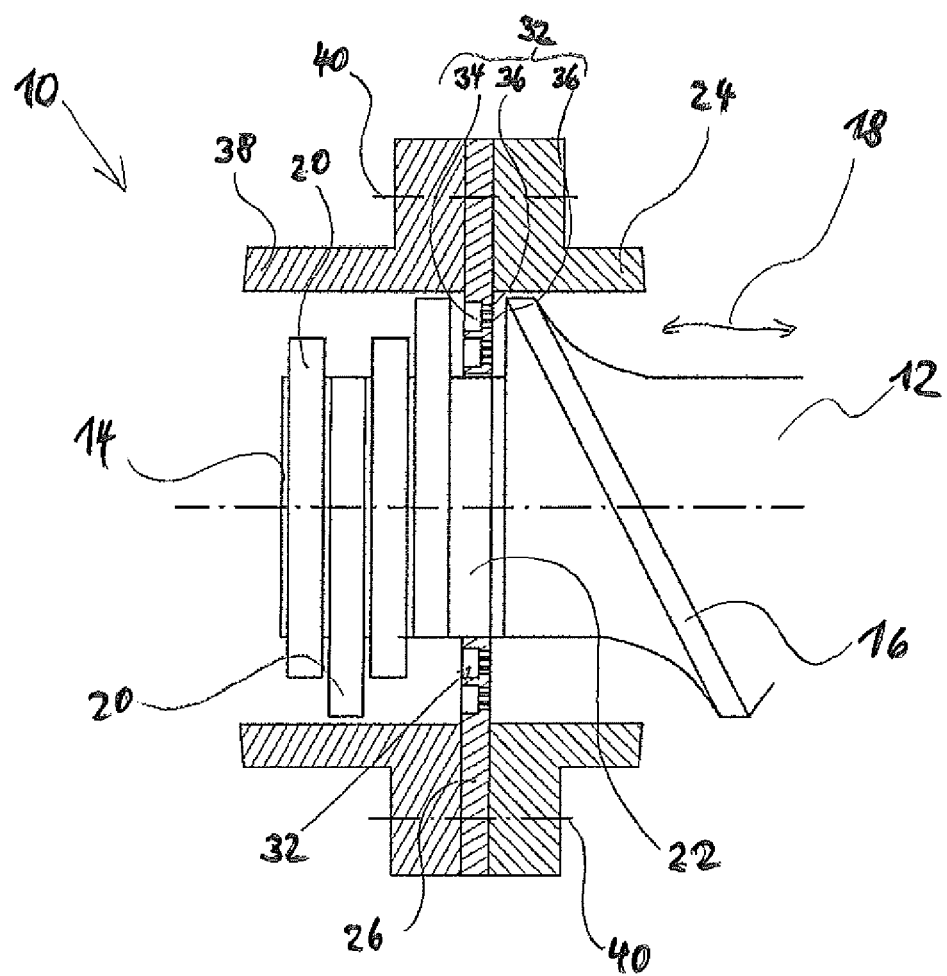
Figure 6:
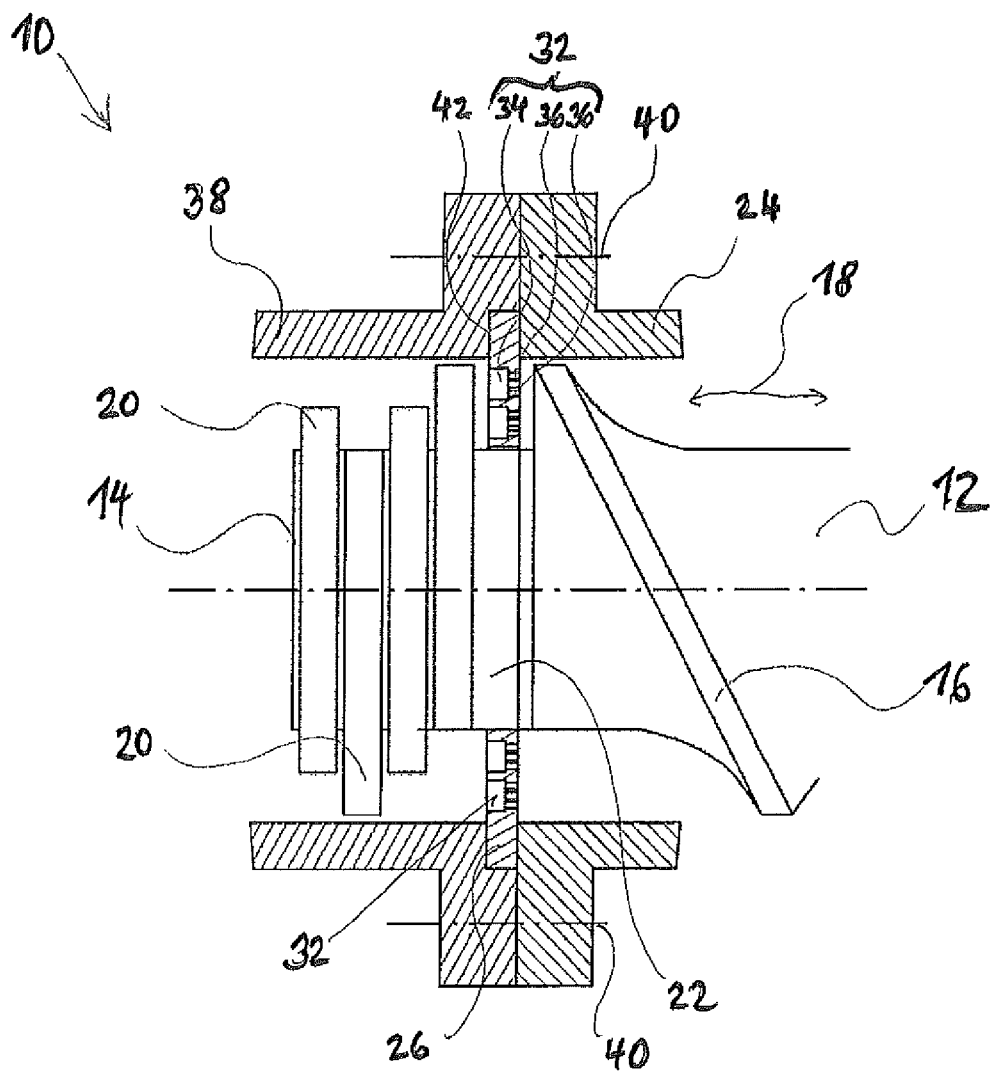
Figure 7:
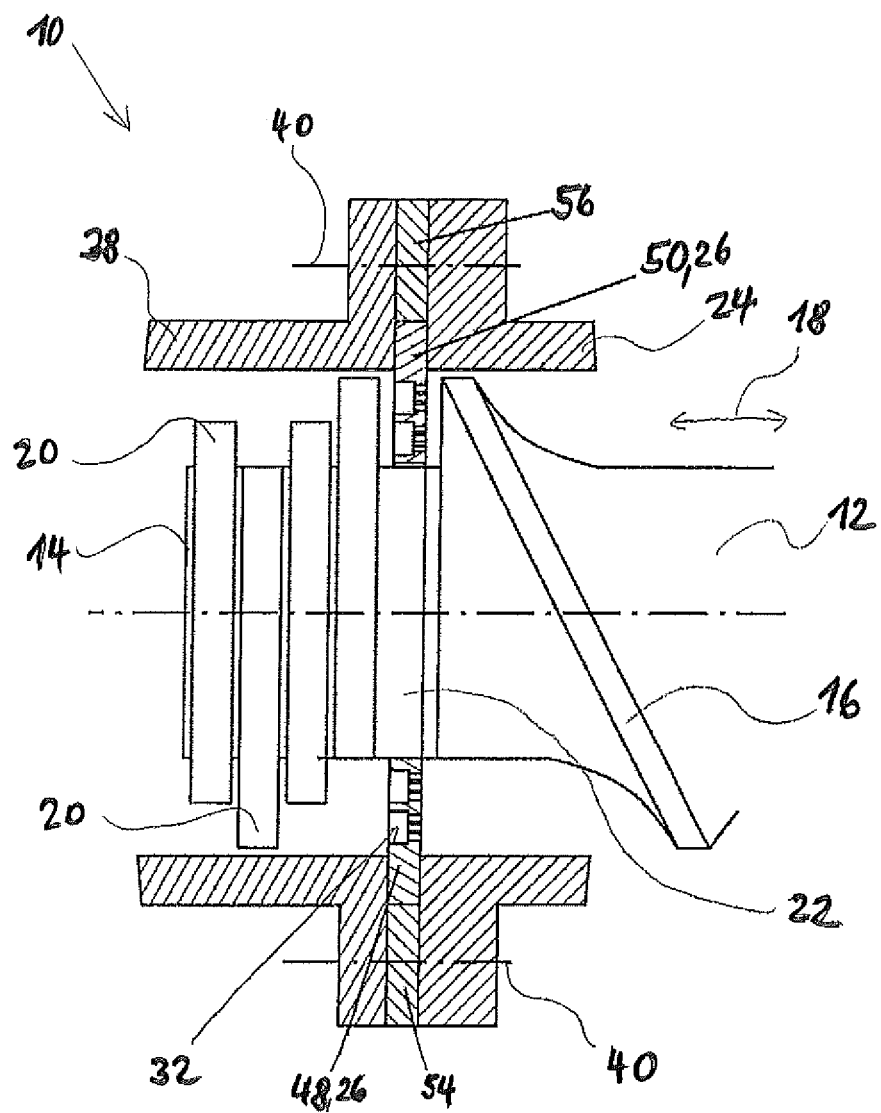
Figure 8:
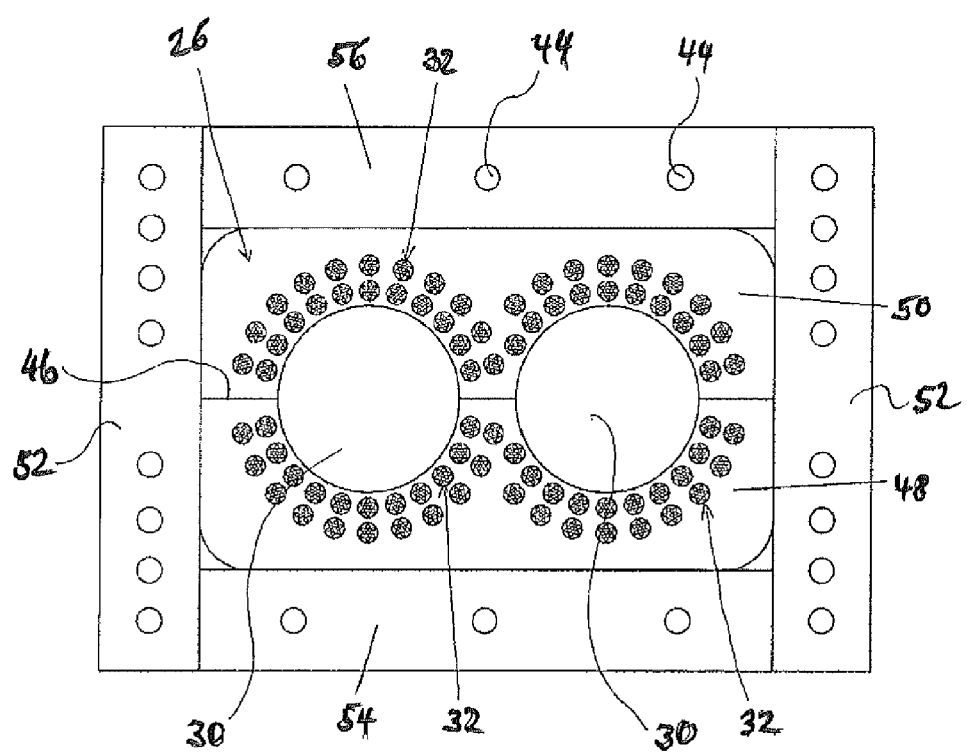

In the following the invention is exemplary explained in further detail with reference to the accompanying figures showing examples of preferred embodiments of the invention. In the figures:

FIG. 1: is a schematic cross sectional view of an extruder according to the invention in a first embodiment, FIG. 2: is a schematic top view of a die plate of the extruder of FIG. 1, FIG. 3: is a schematic cross sectional view of an extruder according to the invention in a second embodiment, FIG. 4: is a schematic top view of a die plate of the extruder of FIG. 3, FIG. 5: is a schematic cross sectional view of an extruder according to the invention in a third embodiment, FIG. 6: is a schematic cross sectional view of an extruder according to the invention in a fourth embodiment, FIG. 7: is a schematic cross sectional view of an extruder according to the invention in a fifth embodiment and FIG. 8: is a schematic top view of a die plate of the extruder of FIG. 7.

FIGS. 9, 10 and 11: show a cross sectional view of die plates which are in contact to each other FIGS. 12, 13, 14, 15, 16, 17, 18, 19 and 20: show cross sectional and top views of certain shapes for the perforation openings.

The extruder 10 as illustrated in FIG. 1 comprises extruder elements 12 of the extruder screw type and a further extruder elements 14 of the kneader type. The extruder elements 12 comprise conveying elements 16 which form a screw for pressure build up and/or conveying product in a flow direction 18.

In the illustrated embodiment the flow direction is the left side to the right side and vice versa, whereby the flow direction from the left side to the right side is preferred. The further extruder elements 14 comprises kneading elements 20. In the illustrated embodiment the extruder elements 12 and the further extruder elements 14 comprise a common shaft 22. In the illustrated embodiment the extruder elements 12 and the further extruder elements 14 are housed by a common barrel 24. A die plate 26 is provided within the barrel 24 and between the extruder elements 12 and the further extruder elements 14. The die plate 26 is fixed to the barrel 24 for instance by welding, particularly laser welding so that no gap is provided between the die plate 26 and the barrel 24. Alternatively, the die plate 26 can be manufactured directly together with the barrel as one piece. The die plate 26 is further positioned between a not illustrated inlet port for feeding a stripping agent and a not illustrated vent port for removal of volatile compounds from the product. The inlet port can be arranged upstream or downstream to the die plate, preferably upstream the die plate 26.

As particularly illustrated in FIG. 2 the die plate 26 comprises a plate body 28. In the illustrated embodiment the plate body 28 comprises two support openings 30 each for the shaft 22 of two different extruder elements 12, 14 arranged parallel to each other for instance in the case of an extruder 10 of the twin screw type. The plate body 28 has a plurality of perforation openings 32 which may be regularly arranged in circumferential direction on different diameters around each support opening. During operation of the extruder 10 the product is pressed mainly only through the perforation openings 32 and, if so at all, through the small gap between the shaft 22 and the plate body 28 at the support opening 30. This leads to a high surface area to volume ratio of the product directly after the die plate 26 in flow direction 18 so that the stripping agent may remove a high amount of volatile compounds of the product.

The embodiment of the extruder 10 illustrated in FIG. 3 and FIG. 4 comprises in comparison to the embodiment illustrated in FIG. 1 stepped perforation openings 32. Preferably all perforation openings 32 comprise a main opening 34 with a larger diameter with extends only partially over the thickness of the die plate 26. The main opening 34 communicates with at least one orifice 36, particularly a plurality of orifices 36, which comprise a smaller diameter than the diameter of the main opening 34. In the illustrated embodiment the main opening 34 is closer to the further extruder elements 14, wherein the orifices 36 are closer to the extruder elements 12.

The embodiment of the extruder 10 illustrated in FIG. 5 comprises in comparison to the embodiment illustrated in FIG. 3 a further barrel 38 for housing the further extruder elements 14, wherein the barrel 24 houses mainly only the extruder elements 12. The die plate 26 is arranged between the front faces of the barrel 24 and the further barrel 38. The barrel 24 and the further barrel 38 are fixed to each other by a flange connection 40. The die plate 26 comprises a radial extension which is chosen such that the die plate 26 can be fixed to the barrel 24 and the further barrel 38 by means of the same flange connection 40. If so, a gasket can be provided between the die plate 26 and the barrel 24 and/or between the die plate 26 and the further barrel 38, wherein the gasket(s) are particularly fixed to the die plate 26. The die plate 26 may provide the function of a flange seal.

In the embodiment of the extruder 10 illustrated in FIG. 6 the further barrel 38 and/or the barrel 24 comprises a recess 42 for receiving the die plate 26. In this embodiment the die plate 26 may be clamped between the barrel 24 and the further barrel 38 without providing holes 44 for being fixed by means of the flange connection 40. Again the die plate 26 may provide the function of a flange seal.

In the embodiment of the extruder 10 illustrated in FIG. 7 and FIG. 8 the die plate 26 is split. The die plate 26 comprises a split 46 extending along a substantially straight line through the center of rotation of the extruder elements 12, 14 arranged in parallel. The split 46 runs mainly horizontally. The die plate 26 or the plate body 28 is cut by the split 46 in a lower body 48 and an upper body 50. During assembling the extruder 10 the lower body 48 can be inserted into the extruder 10 from the bottom in an upwards direction, wherein the upper body 50 can be inserted into the extruder 10 from top downwards direction. In a preferred embodiment the lower body 48 and the upper body 50 can be bordered and/or guided by side inserts 52. Further the lower body 48 and the upper body 50 can be bordered by a lower insert 54 and an upper insert 56. Particularly the inserts 52, 54, 56 are fixed by the flange connection 40.

In the embodiment of the invention illustrated in FIGS. 9, 10 and 11 two die plates 26a and 26b are in contact in flow direction 18 and moveable against each other in a direction orthogonal to the flow direction 19. Die plate 26a comprises channel-shaped perforation openings 32a with large conical inlet sections 35b. Die plate 26b exhibits channel-shaped perforation openings 32b. FIG. 9 shows an arrangement with a maximum effective cross sectional area 33 of the perforation openings 32a and 32b leading through the two die plates 26a and 26b, FIG. 10 shows an arrangement with reduced or throttled effective cross sectional area 33 of the perforation openings 32a and 32b leading through the two die plates 26a and 26b, FIG. 11 shows an arrangement where the effective cross sectional area is zero.

In the embodiment of the invention illustrated in FIGS. 12 to 20, whereby on the left side a cross sectional view and on the right side a top view in flow direction is shown, plates 26 comprise FIG. 12: channel shaped perforation openings 32

Figure 14:
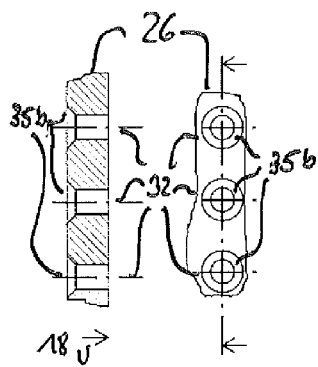
Figure 15:
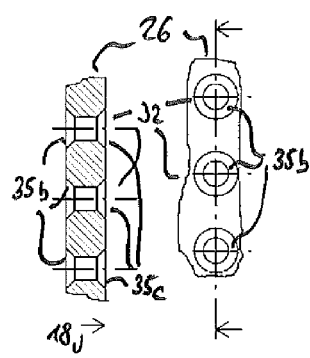
Figure 16:
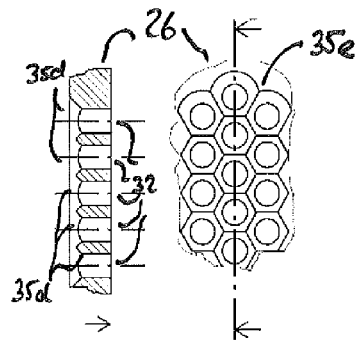
Figure 17:
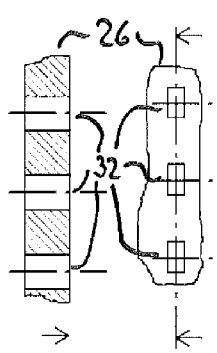

FIG. 13: channel shaped perforation openings 32 having small conical inlet sections 35a FIG. 14: channel shaped perforation openings 32 having large conical inlet sections 35b FIG. 15: channel shaped perforation openings 32 having large conical inlet sections 35b and large conical outlet sections 35c FIG. 16: channel shaped perforation openings 32 having large overlapping conical inlet sections 35d. The perforation openings 32 are arranged in a honeycomb structure 35e FIG. 17: acircular (rectangular) channel shaped perforation openings 32

Figure 18:
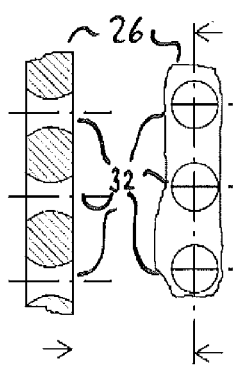

FIG. 18: hour-glass shaped perforation openings 32

Figure 19:
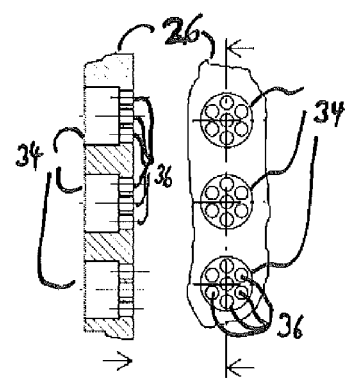

FIG. 19: perforation openings 32 comprising a main opening 34 with a larger diameter with extends only partially over the thickness of the die plate 26. Each main opening 34 communicates with eight orifices 36.

Figure 20:
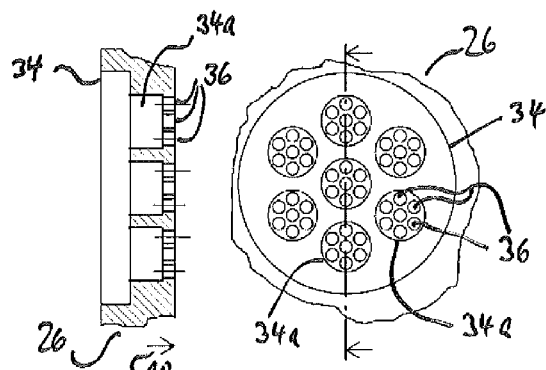

FIG. 20: a perforation opening 32 comprising a main opening 34 with a larger diameter with extends only partially over the thickness of the die plate 26 and seven intermediate openings 34a extending only over the middle part (thickness) of the die plate 26. Each intermediate opening 34a communicates with eight orifices 36.

In all FIGS. 12 to 20 the flow direction 18 is indicated.

It is possible to combine specific constructional designs of particular elements of different embodiments illustrated in different figures. For example a split die plate 26 can be fixed without the inserts 52, 54, 56 and/or the perforation openings 32 of a split die plate 26 may be not stepped.

The reference numerals used hereinbefore are summarized below:

10 extruder
12 extruder elements
14 further extruder elements
16 conveying elements
18 flow direction
19 direction orthogonal to flow direction
20 kneading elements
22 shaft
24 barrel
26, 26a, 26b die plate
28 plate body
30 support opening(s)
32, 32a, 32b perforation opening(s)
33 effective cross sectional area
34 main opening
34a intermediate opening
35a,b,d conical inlet sections
35c conical outlet section
35e honeycomb structure
36 orifice(s)
38 further barrel
40 flange connection
42 recess
46 split
48 lower body (of plate body 28)
50 upper body (of plate body 28)
52 side inserts
54 lower insert
56 upper insert

The invention claimed is:

1. A process of removing volatile compounds from a mixture (M) containing at least one halogenated butyl rubber and at least one volatile compound to obtain a product (P) comprising less than 0.5 wt % of water and less than 0.75 wt % of volatile organic compounds based on the mass of the polymer, the process comprising at least the steps of:
feeding the mixture (M) into at least one extruder (10) comprising:
one barrel (24),
at least one extruder element arranged inside the barrel (24),
at least one outlet port for removing volatile compounds, and
at least one perforated die plate (26) fixed to the barrel (24) in a flow direction (18) before the outlet port,
pressing the mixture (M) through the at least one die plate (26) of said extruder (10), and
removing the volatile compounds through the at least one outlet port of said extruder (10).

2. The process according to claim 1, wherein the mixture (M) contains from
i) 10 to 95 wt % of the halogenated butyl rubber and
ii) volatile compounds
whereby the aforementioned components i) and ii) add up to 90 to 100 wt-% of the total mass of mixture (M).

3. The process according to claim 1, wherein the extruder (10) further comprises at least one inlet port for feeding a stripping agent into the barrel and whereby the at least one perforated die plate (26) is fixed to the barrel (24) between the inlet port and the outlet port, and the method further comprises feeding stripping agent into the barrel to contact the halogenated butyl rubber to enhance devolatilization of the volatile components from the halogenated butyl rubber.

4. The process according to claim 1, wherein the die plate (26) comprises at least one support opening (30) each for receiving a shaft (22) of the corresponding extruder elements (12, 14) and the process further comprises configuring the support opening in relation to the shaft to force the halogenated butyl rubber through perforations of the perforated die plate.

5. The process according to claim 4, wherein the support opening (30) provides a slide bearing for the shaft (22) of the extruder elements (12, 14).

6. The process according to claim 5, wherein in the extruder (10) a clearance s is provided between an inner rim of the support opening (30) and the shaft (22) of the extruder elements (12, 14), and the process comprises configuring the clearance s in relation to an inner diameter D of the barrel (24) to be $0.001 \leq s/D \leq 0.02$, to minimize flow of halogenated butyl rubber through the clearance and force the halogenated butyl rubber through the perforations of the perforated die plate.

7. The process according to claim 1, wherein the die plate (26) comprises at least one perforation opening (32), wherein the perforation opening (32) comprises in an axial direction of the barrel (24) in the flow direction a main opening (34) extending only over a part of the axial thickness of the die plate (26), wherein the main opening (34) is followed in the flow direction by at least one orifice (36), wherein the orifice (36) comprises a smaller cross section than the main opening (34), and the method further comprises flowing the halogenated butyl rubber through the perforated die plate respectively through the main openings and the at least one orifice.

8. The process according to claim 1, wherein the die plate (26) comprises a plurality of perforation openings (32), wherein the perforation openings (32) comprises on the downstream side an average diameter d of $1 \text{ mm} \leq d \leq 6 \text{ mm}$, and the method further comprises flowing the halogenated butyl rubber through the plurality of openings (32).

9. The process according to claim 1, wherein the extruder (10) comprises an extruder screw (16), downstream to the die plate (26) and particularly upstream to the outlet port and the method further comprises moving the halogenated butyl rubber through the barrel from the die plate and past the outlet port with the extruder screw.

10. The process according to claim 9, wherein a maximum axial distance S between the conveying screw (16) and the die plate (26) is $0.5 \text{ mm} \leq S \leq 10 \text{ mm}$.

11. The process according to claim 10, wherein the further extruder element comprises a larger free volume than the extruder element (12).

12. The process according to claim 3, wherein the extruder element further comprises kneader elements (20) disposed in the flow direction prior to the die plate, and the method further comprises kneading the halogenated butyl rubber to enhance contact of the halogenated butyl rubber with the stripping agent to enhance devolatilization of the volatile components from the halogenated butyl rubber.

13. The process according to claim 12, wherein the kneader elements (20) have a shear edge profile or a box profile.

14. The process according to claim 1, wherein in the extruder (10) comprises a further barrel (38) particularly for housing a further extruder elements (14), and the method comprises fixing the die plate (26) between the barrel (24) and the further barrel (38), by means of a flange joint (40).

15. The process according to claim 14, wherein the barrel (24) or further barrel (38) comprises a recess (42) for receiving at least partially the die plate (26) and the method further comprises disposing the die plate in the recess.

16. The process according to claim 1, wherein the die plate (26) is split in a radial direction into at least first and second die portions, wherein the split (46) is arranged radial to an at least one support opening (30) each for receiving a shaft (22) of a corresponding at least one extruder element, and the method further comprises disposing the first and second die portions about the at least one extruder element to join the die portions at the radial split.

17. The process according to claim 1, wherein the die plate (26) is bordered by inserts (52, 54, 56), and the method further comprises fixing the inserts (52, 54, 56) to the barrel (24) to fix the die plate with respect to the barrel.

18. An extruder for removing volatile compounds from a mixture (M) containing butyl rubber and at least one volatile compound, the extruder comprising:
a barrel (24) defining an interior chamber therein,
at least one perforated die plate (26) disposed within the barrel (24) to divide the interior chamber into at least a first chamber and a second chamber,
at least one extruder element arranged inside the barrel (24) to move the mixture through the barrel in a flow direction from the first chamber to the second chamber and force the mixture through perforation openings of the perforated die plate (26),
at least one outlet port disposed in fluid communication with the second chamber for removing volatile compounds from the second chamber;
at least one inlet port disposed in fluid communication with the first chamber for introducing a stripping agent into the first chamber; and
at least one mixing element disposed in the first chamber for increasing contact of a stripping agent with the mixture as the mixture passes through the first chamber.

19. The extruder according to claim 18, wherein the mixing element comprises kneader elements (20).

20. The extruder according to claim 19, wherein:
the die plate (26) comprises at least one support opening (30) for receiving a shaft (22) of the corresponding extruder elements;
a clearance s is provided between an inner rim of the support opening (30) and the shaft (22) of the extruder element, and the clearance s in relation to an inner diameter D of the barrel (24) is $0.001 \leq s/D \leq 0.02$; and
the die plate (26) comprises a plurality of the perforation openings (32), wherein the perforation openings (32) comprises on the downstream side an average diameter d of $1 \text{ mm} \leq d \leq 6 \text{ mm}$.

* * * * *